(12) United States Patent
Anderson, Jr.

(10) Patent No.: US 12,727,590 B2
(45) Date of Patent: Sep. 8, 2026

(54) ICE-FISHING HOLE COVER

(71) Applicant: Kenneth Allen Anderson, Jr., Grand Rapids, MN (US)

(72) Inventor: Kenneth Allen Anderson, Jr., Grand Rapids, MN (US)

( * ) Notice: Subject to any disclaimer, the term of this patent is extended or adjusted under 35 U.S.C. 154(b) by 0 days.

(21) Appl. No.: 19/342,473

(22) Filed: Sep. 26, 2025

(65) Prior Publication Data

US 2026/0083111 A1 Mar. 26, 2026

Related U.S. Application Data

(60) Provisional application No. 63/699,641, filed on Sep. 26, 2024.

(51) Int. Cl.
*A01K 97/01* (2006.01)

(52) U.S. Cl.
CPC .................................... *A01K 97/01* (2013.01)

(58) Field of Classification Search
CPC ...................................................... A01K 97/01
USPC ................................................................ 43/4
See application file for complete search history.

(56) References Cited

U.S. PATENT DOCUMENTS 6,158,160 A * 12/2000 Sykes .................... A01K 97/01 43/4.5
7,487,734 B2 * 2/2009 Davis ...................... B63C 13/00 296/35.3
7,818,913 B1 * 10/2010 Hoglund ................ A01K 97/01 43/16
11,856,934 B2 * 1/2024 Sahli ...................... A01K 97/01
12,433,278 B1 * 10/2025 Tenor ..................... A01K 97/11
2007/0186460 A1 * 8/2007 Harris .................... A01K 97/01 43/4
2020/0022351 A1 * 1/2020 McCarter ............... A01K 97/01
2020/0253182 A1 * 8/2020 Lindgren ............... A01K 97/01
2023/0070991 A1 * 3/2023 Makos ................... A01K 97/01
2023/0380398 A1 * 11/2023 Sahli ...................... A01K 97/01
2025/0280811 A1 * 9/2025 Sumption .............. A01K 97/01
2025/0346278 A1 * 11/2025 Norlen .................... B62B 13/02

FOREIGN PATENT DOCUMENTS

CA 1250745 A * 3/1989 ............. A01K 97/01

OTHER PUBLICATIONS

Finicky Fooler Hole Cover & Rim, Retrieved from Internet. Retrieved on Sep. 26, 2025.

* cited by examiner

*Primary Examiner* — Christopher P Ellis

(57) ABSTRACT

An ice-fishing hole cover is an apparatus that thermally insulates an ice-fishing hole in order to prevent the ice-fishing hole from freezing over. The apparatus also allows a fishing line to pass through an ice-fishing hole as the apparatus seals the ice-fishing hole. The apparatus includes a hole cover and a living hinge. The hole cover includes a left half-cover piece and a right half-cover piece, which are the two pieces of thermally-insulative material that are used to thermally insulate and hermetically seal an ice-fishing hole. The living hinge is used to hingedly connect the left half-cover piece and the right half-cover piece so that the apparatus can extend into its operative configuration or can retract into its collapsed configuration. In the operative configuration, a slot forms in between the left half-cover piece and the right half-cover piece and allows a fishing line to pass through the hole cover.

20 Claims, 8 Drawing Sheets

ICE-FISHING HOLE COVER

The current application claims a priority to the U.S. provisional patent application Ser. No. 63/699,641 filed on Sep. 26, 2024.

FIELD OF THE INVENTION

The present invention generally relates to an apparatus that subdues the freezing process of an ice fishing hole. More specifically, the present invention insulates the water in the ice fishing hole to prolong the amount of time the ice fishing hole will stay open.

BACKGROUND OF THE INVENTION

In ice fishing, holes are drilled in frozen lakes or rivers to fish through the ice. The size of the hole typically ranges in diameter, depending on the type of fish being targeted and the tools used to make the hole. The time that an ice fishing hole stays open without freezing over depends on several factors, including the air temperature, wind conditions, and the thickness of the ice. In colder temperatures, the hole can start refreezing within a matter of minutes, while in milder conditions, it may remain open longer.

In order to keep the hole from freezing over, some individuals use slush from the drilling process to insulate the edges of the hole or place a cover over it when not actively fishing. Fishermen typically have tools, such as an ice skimmer, to clear away the thin layer of ice that forms, allowing them to continue fishing without the need to re-drill the hole. Most methods and devices however do not enable fishermen to continue to fish while preventing the ice fishing hole from refreezing.

Therefore, an objective of the present invention is to provide users with an apparatus that subdues the freezing process of an ice fishing hole. The present invention intends to provide users with an apparatus that seals the hole from colder outside air and insulates the water in the hole. In order to accomplish that, a preferred embodiment of the present invention comprises a first half body, a second half body, and a living hinge. Further, the first half body and second half body are conjoined to form an insulating body. The present invention is consequently able to subdue the freezing process of an ice fishing hole while enabling an individual to continue fishing within the ice fishing hole.

SUMMARY OF THE INVENTION

The present invention is an ice fishing hole insulator. The present invention seeks to provide users with a device that enables individuals to continue fishing within an ice fishing hole while preventing or slowing down the process of the ice fishing hole refreezing. In order to accomplish this the present invention comprises a first half body that provides a semi-polygonal shape. Further, the second half body is a semi-polygonal shape that conjoins to the first half body to form an insulating body that fits into an ice fishing hole. Additionally, a living hinge enables the first half body and the second half body to fold up and unfold as needed. Thus, the present invention is an apparatus that subdues the freezing process of an ice fishing hole while enabling an individual to continue fishing within the ice fishing hole.

DETAILED DESCRIPTION OF THE INVENTION

All illustrations of the drawings are for the purpose of describing selected versions of the present invention and are not intended to limit the scope of the present invention.

Figure 1:
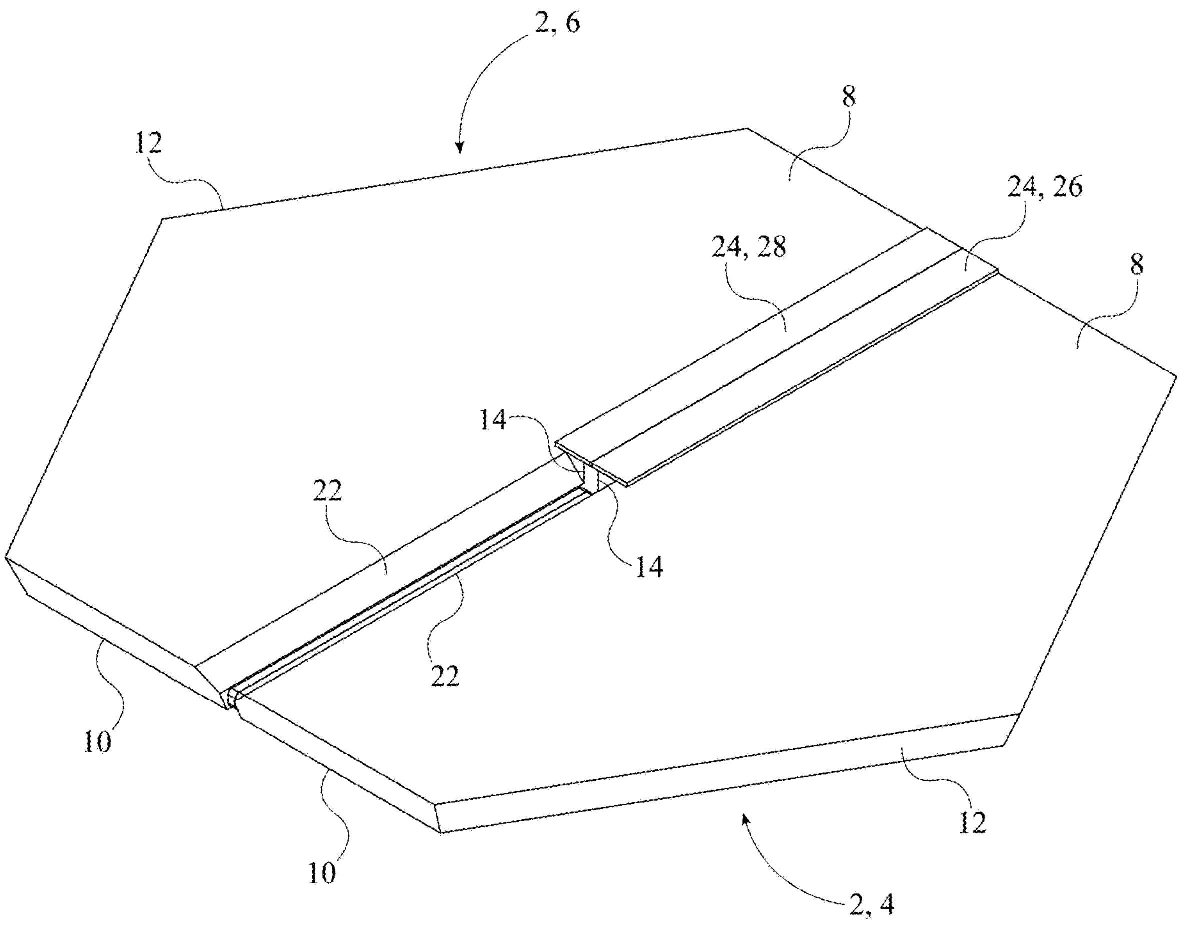
FIG. 1 is a top-front perspective view of the present invention in its operative configuration.
Figure 2:
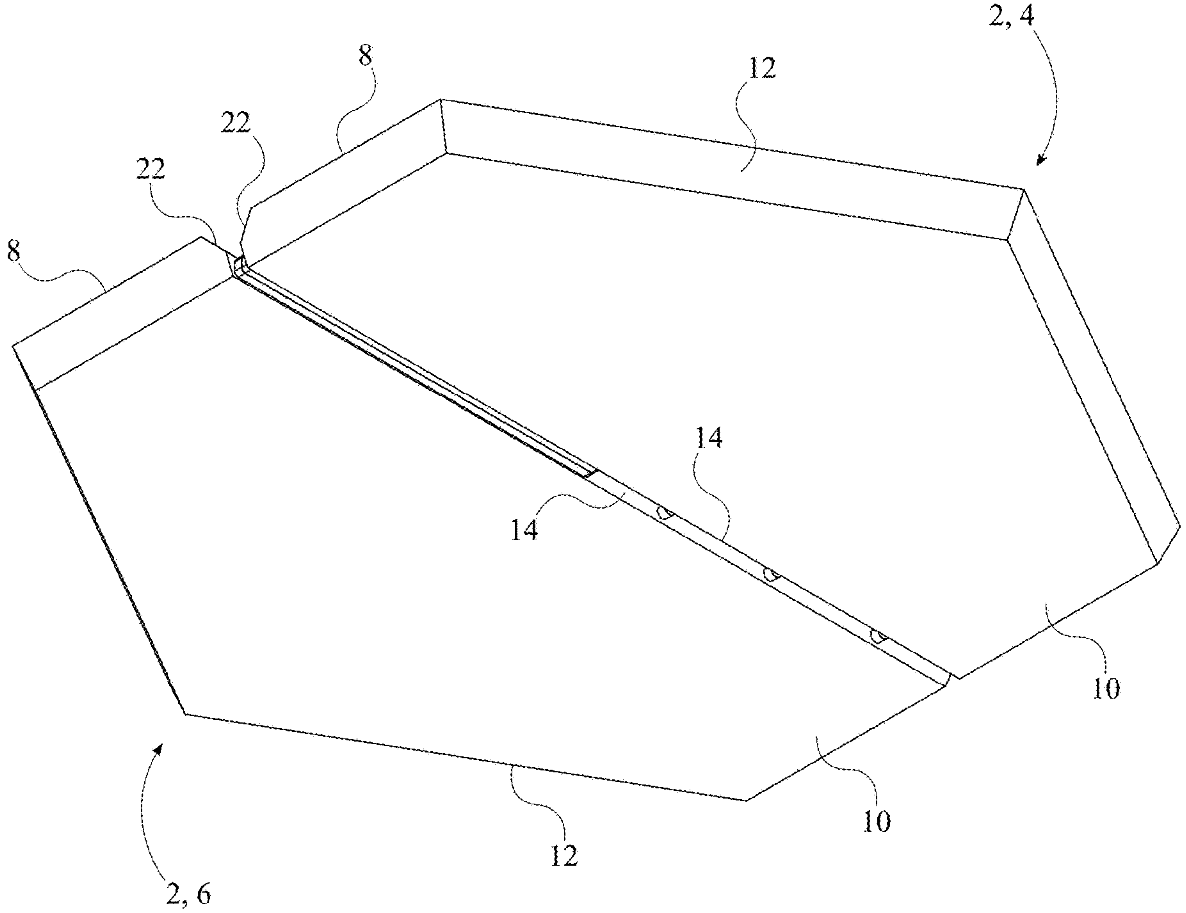
FIG. 2 is a bottom-front perspective view of the present invention in its operative configuration.
Figure 3:
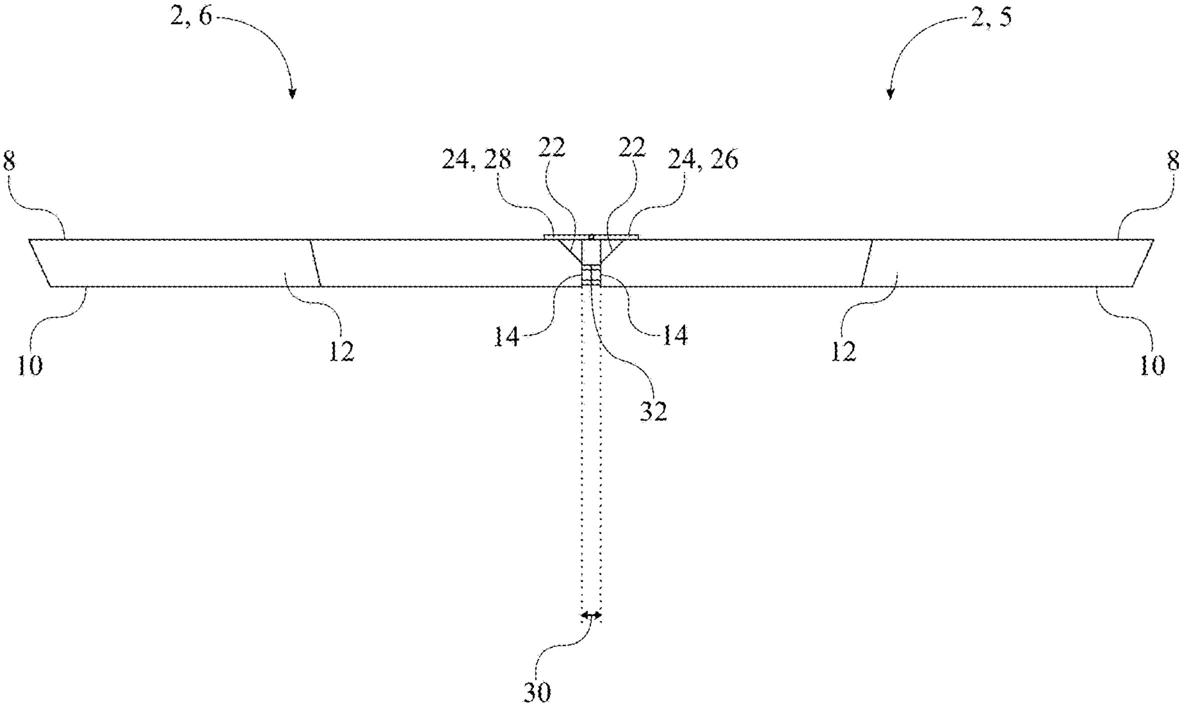
FIG. 3 is a front view of the present invention in its operative configuration.
Figure 4:
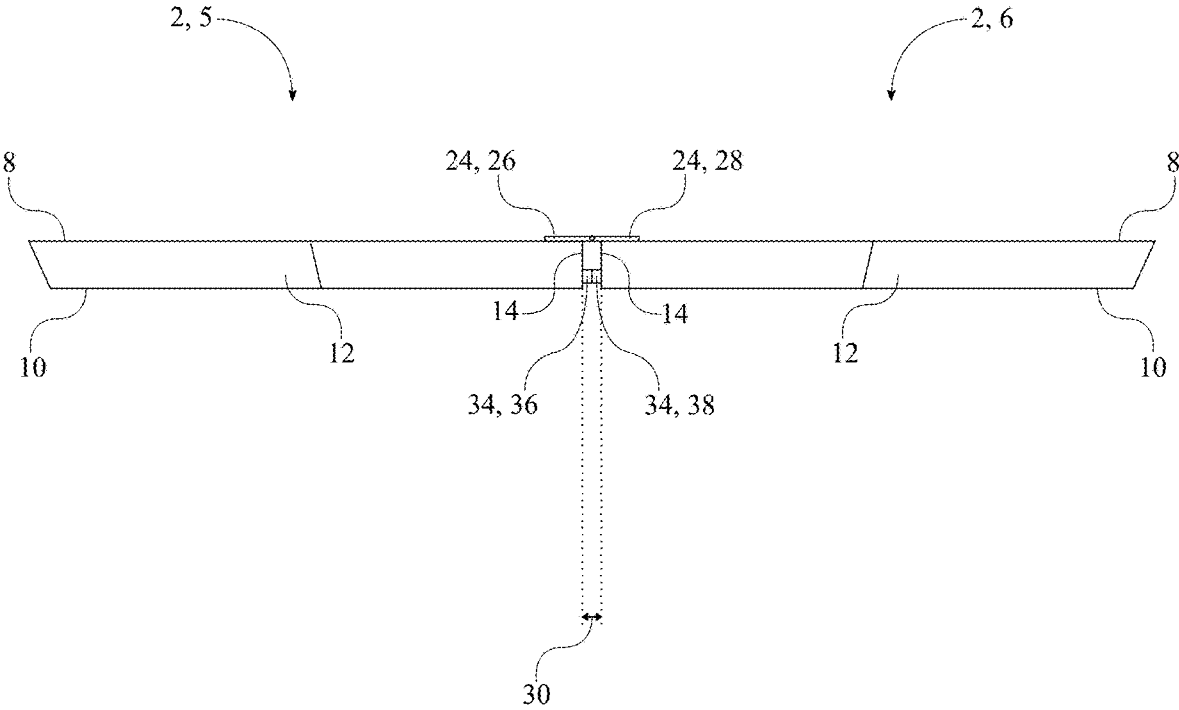
FIG. 4 is a rear view of the present invention in its operative configuration.
Figure 5:
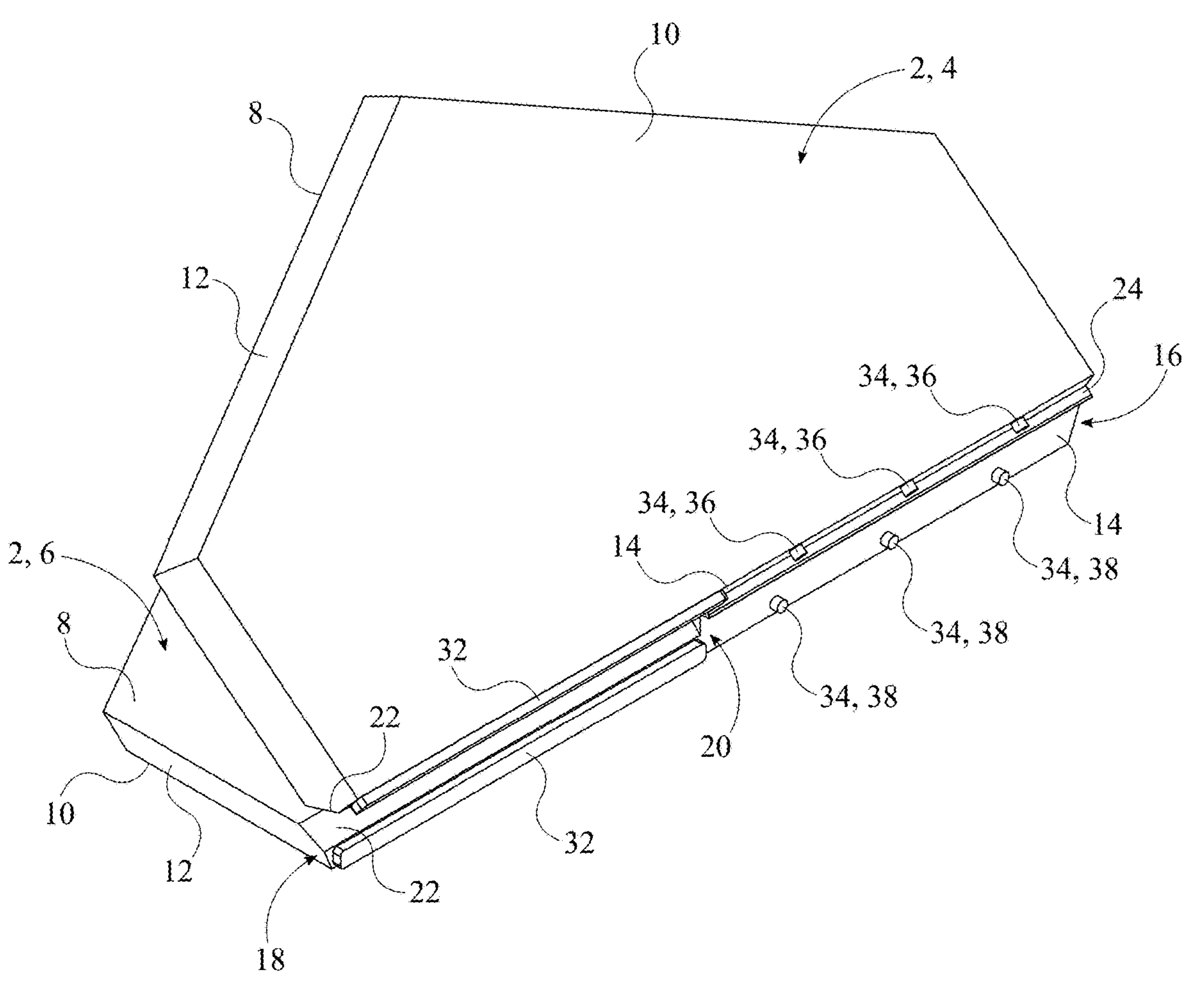
FIG. 5 is a top-front perspective view of the present invention in its collapsed configuration.
Figure 6:
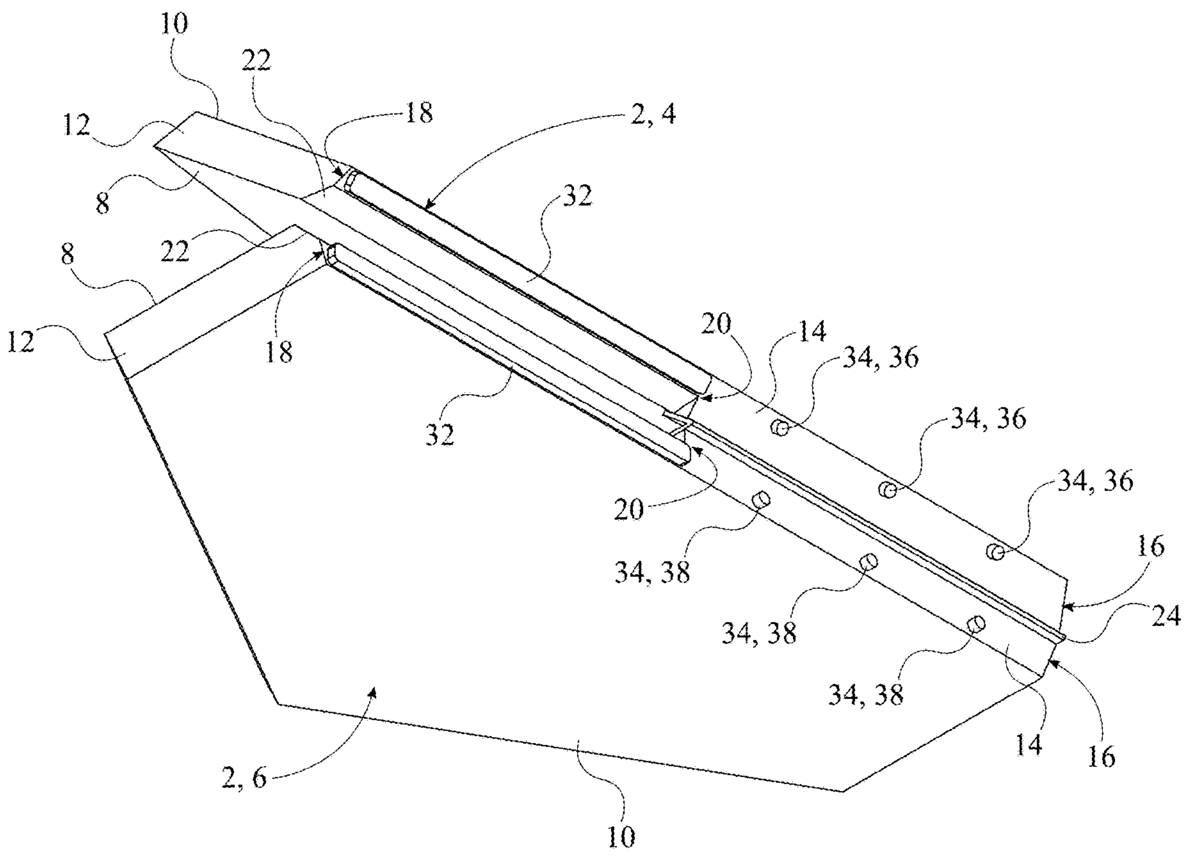
FIG. 6 is a bottom-front perspective view of the present invention in its collapsed configuration.
Figure 7:
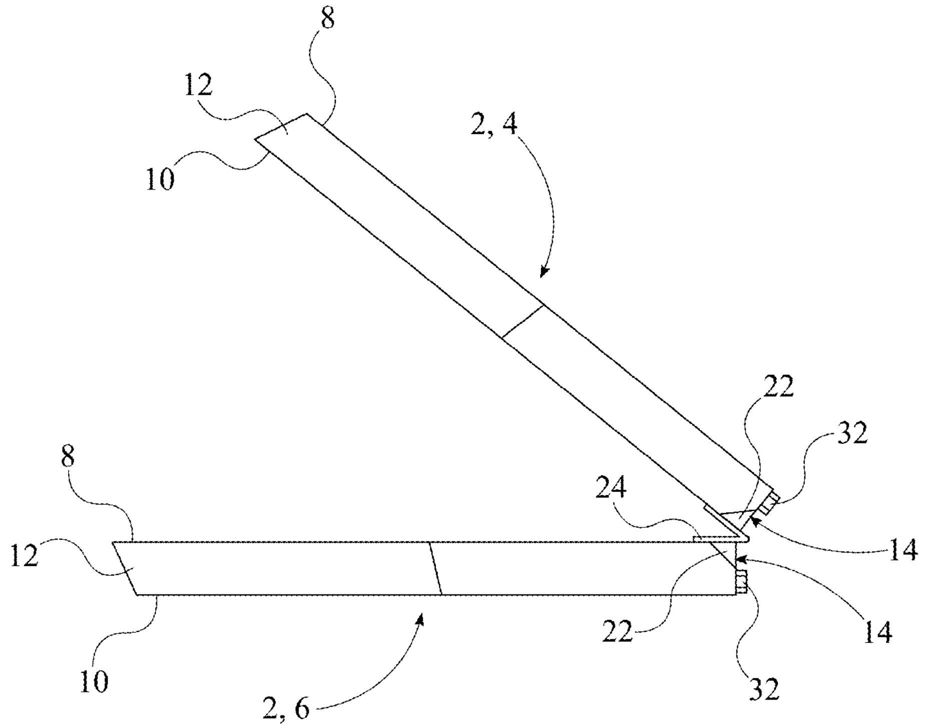
FIG. 7 is a front view of the present invention in its collapsed configuration.

As can be seen in FIGS. 1 through 7, the present invention is an ice-fishing hole cover that is used to close off the water surface exposed by an ice-fishing hole, which prevents the colder air above the ice-fishing hole from freezing the water surface and icing over the ice-fishing hole. The present invention also allows a fishing line to pass into an ice-fishing hole as the ice-fishing hole is closed off by the present invention. Thus, the present invention comprises a hole cover 2 and a living hinge 24. The hole cover 2 is two separate pieces of thermally-insulative material that hermetically plug an ice-fishing hole, while the living hinge 24 allows those two separate pieces of thermally-insulative material to extend in an operative configuration and to retract into a collapsed configuration. The hole cover 2 comprises a left prismatic half-cover piece 4 and a right prismatic half-cover piece 6, which are those two separate pieces of thermally-insulative material that are on opposing sides of the hole cover 2. Moreover, the living hinge 24 comprises a left hinge portion 26 and a right hinge portion 28. The left hinge portion 26 is used to connect the living hinge 24 to the left prismatic half-cover piece 4, and the right hinge portion 28 is used to connect the living hinge 24 to the right prismatic half-cover piece 6.

In order to better define the spatial geometry of the hole cover 2, the left prismatic half-cover piece 4 and the right prismatic half-cover piece 6 each comprise a top base surface 8, a bottom base surface 10, a convex lateral surface 12, and a straight lateral surface 14, which are shown in FIGS. 1 through 7. The top base surface 8 and the bottom base surface 10 are positioned opposite to each other about a prismatically-shaped body, while the convex lateral surface 12 and the straight lateral surface 14 are positioned in between the top base surface 10 and the bottom base surface 10. Moreover, the straight lateral surface 14 comprises a first end section 16, a second end section 18, and a middle section 20. The first end section 16 is positioned at one intersection between the straight lateral surface 14 and the convex lateral surface 12, and the second end section 18 is positioned at the other opposing intersection between the straight lateral surface 14 and the convex lateral surface 12. The middle section 20 is also positioned equidistant between the first end section 16 and the second end section 18 along the straight lateral surface 14.

As can be seen in FIGS. 1 through 7, a general configuration for the aforementioned components allows the present invention to effectively and efficiently close off an ice-fishing hole while still allowing a fishing line to pass into the ice-fishing hole. The straight lateral surface 14 of the left prismatic half-cover piece 4 and the straight lateral surface 14 of the right prismatic half-cover piece 6 are positioned along each other so that a periphery of the hole cover 2 is formed by orienting the convex lateral surface 12 of the left prismatic half-cover piece 4 and the convex lateral surface 12 of the right prismatic half-cover piece 6 away from each other. The left hinge portion 26 is connected onto the top base surface 8 of the left prismatic half-cover piece 4, adjacent to the straight lateral surface 14 of the left prismatic half-cover piece 4, which allows the left prismatic half-cover piece 4 to hingedly move in relation to the rest of the present invention. Likewise, the right hinge portion 28 is connected onto the top base surface 8 of the right prismatic half-cover piece 6, adjacent to the straight lateral surface 14 of the right prismatic half-cover piece 6, which allows the right prismatic half-cover piece 6 to hingedly move in relation to the rest of the present invention. This arrangement between the left prismatic half-cover piece 4, the left hinge portion 26, the right prismatic half-cover piece 6, and the right hinge portion 28 allows the left prismatic half-cover piece 4 and the right prismatic half-cover piece 6 to move about the living hinge 24 into an operative configuration or a collapsed configuration. In the operative configuration shown in FIGS. 1 through 4, the left prismatic half-cover piece 4 and the right prismatic half-cover piece 6 are positioned coplanar and adjacent to each other so that the hole cover 2 can extend across the entire exposed water surface of an ice-fishing hole. In a collapsed configuration shown in FIGS. 5 through 7, the left prismatic half-cover piece 4 and the right prismatic half-cover piece 6 are folded in a V-shape against each other so that the hole cover 2 can retract to a smaller size and be then removed from an ice-fishing hole. Moreover, the living hinge 24 is positioned adjacent to the top base surface 8 of the left prismatic half-cover piece 4 and the top base surface 8 of the right prismatic half-cover piece 6 so that a user can press down from the top of the hole cover 2 in order to push the hole cover 2 into the collapsed configuration.

As can be seen in FIGS. 1 through 4, the present invention also allows a fishing line to pass through a slot formed in between the straight lateral surface 14 of the left prismatic half-cover piece 4 and the straight lateral surface 14 of the right prismatic half-cover piece 6. Thus, the left prismatic half-cover piece 4 and the right prismatic half-cover piece 6 each further comprise a slot chamfer 22, which is integrated along an intersection edge between the top base surface 8 and the straight lateral surface 14. The slot chamfer 22 of the left prismatic half-cover piece 4 and the slot chamfer 22 of the right prismatic half-cover piece 6 together create a larger entrance for the slot so that a fishing line can be more easily guided through the slot. The slot chamfer 22 is also positioned between the middle section 20 and the second end section 18 so that the slot chamfer 22 of the left prismatic half-cover piece 4 and the slot chamfer 22 of the right prismatic half-cover piece 6 does not mechanically interfere with the living hinge 24.

Figure 8:
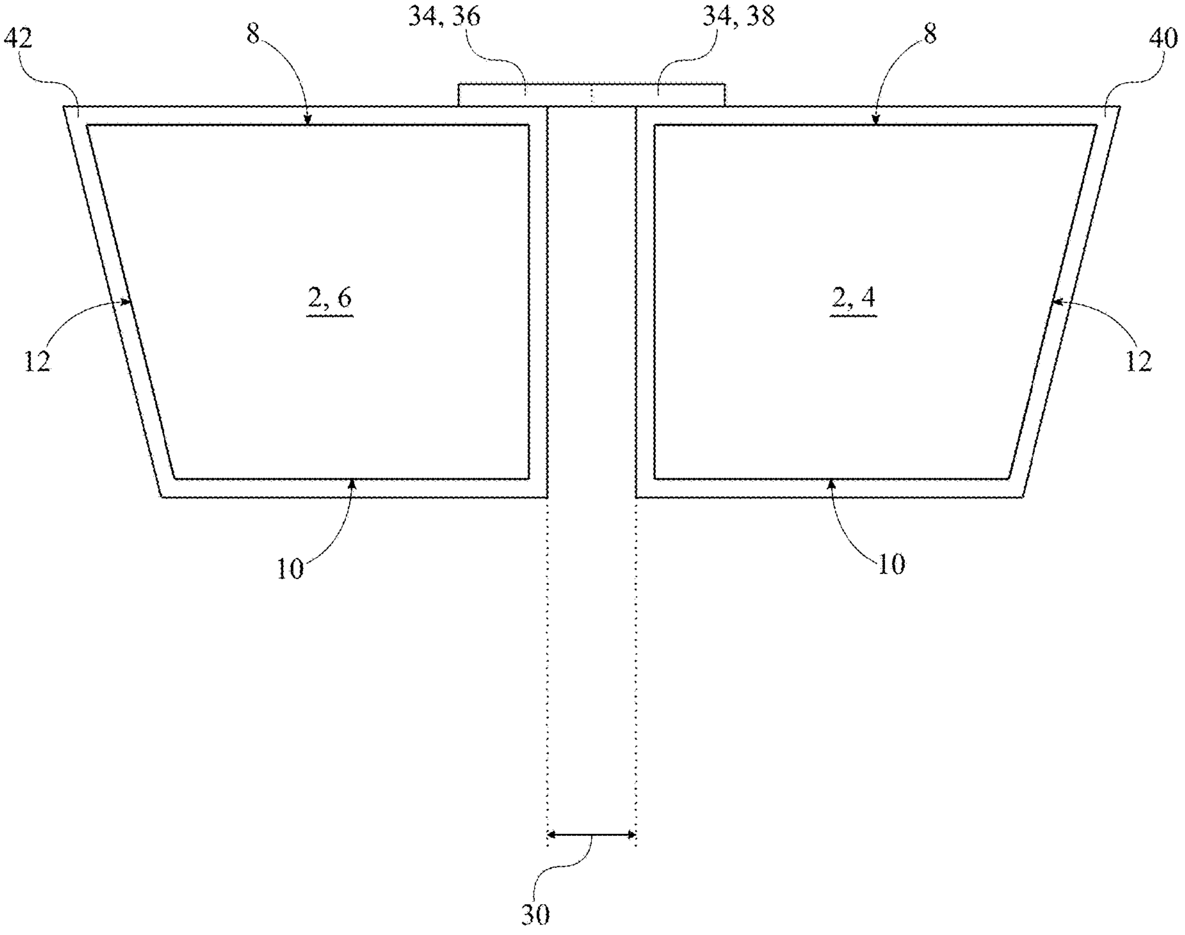
FIG. 8 is a cross-sectional schematic view of the present invention.

More specifically, when the left prismatic half-cover piece 4 and the right prismatic half-cover piece 6 are arranged in an operative configuration, the slot is positioned in between the straight lateral surface 14 of the left prismatic half-cover piece 4 and the straight lateral surface 14 of the right prismatic half-cover piece 6, which is shown in FIGS. 1 through 4 and 8. Thus, in the operative configuration, the straight lateral surface 14 of the left prismatic half-cover piece 4 and the straight lateral surface 14 of the right prismatic half-cover piece 6 are positioned parallel and offset to each other by a slot gap 30, which is the clearance width between the straight lateral surface 14 of the left prismatic half-cover piece 4 and the straight lateral surface 14 of the right prismatic half-cover piece 6. The slot gap 30 needs to be wide enough to accommodate the thickness of a fishing line but is typically much larger than the thickness of a fishing line. Moreover, the present invention may further comprise a plurality of bristles 32, which is used to thermally insulate the slot from the colder air above the hole cover 2 while still allowing a fishing line to pass through the slot amongst the plurality of bristles 32. Thus, the plurality of bristles 32 needs to be positioned through the slot gap 30 and needs to be mounted in between the straight lateral surface 14 of the left prismatic half-cover piece 4 and the straight lateral surface 14 of the right prismatic half-cover piece 6. The slot gap 30 is preferably large enough to accommodate the space occupied by the plurality of bristles 32. The plurality of bristles 32 is also positioned between the middle section 20 and the second end section 18 so that the plurality of bristles 32 thermally insulates the portion of the slot that is uncovered by the living hinge 24.

As can be seen in FIGS. 1 through 7, the present invention allows the left prismatic half-cover piece 4 and the right prismatic half-cover piece 6 to securely remain in the operative configuration. Thus, the present invention may comprise at least one magnetic fastener 34, which allows the straight lateral surface 14 of the left prismatic half-cover piece 4 and the straight lateral surface 14 of the right prismatic half-cover piece 6 to be magnetically attached to each other. The at least one magnetic fastener 34 comprises a left fastener piece 36 and a right fastener piece 38, which are two opposing engagement pieces of the at least one magnetic fastener 34. The left fastener piece 36 is integrated into the straight lateral surface 14 of the left prismatic half-cover piece 4, and the right fastener piece 38 is integrated into the straight lateral surface 14 of the right prismatic half-cover piece 6 so that the left fastener piece 36 and the right fastener piece 38 are on opposing sides of the slot and are readily able to magnetically attach to each other. Moreover, the left fastener piece 36 is positioned in between the middle section 20 of the left prismatic half-cover piece 4 and the first end section 16 of the left prismatic half-cover piece 4, while the right fastener piece 38 being is in between the middle section 20 of the right prismatic half-cover piece 6 and the first end section 16 of the right prismatic half-cover piece 6, which allows the at least one magnetic fastener 34 to be positioned within the portion of the slot that is covered by the living hinge 24 and that is not occupied by the plurality of bristles 32. In some embodiments of the present invention, the at least one magnetic fastener 34 is a plurality of magnetic fasteners in order to better secure the left prismatic half-cover piece 4 and the right prismatic half-cover piece 6 in the operative configuration. The plurality of magnetic fasteners can be distributed along the portion of the slot that is covered by the living hinge 24.

As can be seen in FIGS. 1 through 8, the present invention can be designed with specific materials in order to improve its functionality in covering an ice-fishing hole. The left prismatic half-cover piece 4 and the right prismatic half-cover piece 6 are preferably made of a thermally-insulative rigid foam. Moreover, the present invention may further comprise a left silicone coating 40 and a right silicone coating 42, which is used to weatherproof the present invention from the cold climate conditions. Thus, the left silicone coating 40 is externally applied to the left prismatic half-cover piece 4, while the right silicone coating 42 is externally applied to the right prismatic half-cover piece 6.

Furthermore, the living hinge 24 is made of a flexible plastic (e.g., a corrugated piece of plastic).

As can be seen in FIGS. 1 through 7, the present invention can be designed to optimize its physical characteristics with the left prismatic half-cover piece 4 and the right prismatic half-cover piece 6 in the operative configuration. One such physical characteristic is that the convex lateral surface 12 of the left prismatic half-cover piece 4 and the convex lateral surface 12 of the right prismatic half-cover piece 6 forms a combined lateral surface of the hole cover 2, and the combined lateral surface is shaped with at least one straight section. This physical characteristic prevents the present invention from rolling away in wind across the ice in case a user drops the present invention on the ice. Moreover, the combined lateral surface is preferably shaped as a hexagon but can alternatively be shaped as another kind of polygon (e.g., a triangle, a square, a quadrilateral, a pentagon, etc.). Another such physical characteristic is that the combined lateral surface tapers from a combined top surface of hole cover 2 to a combined bottom surface of the hole cover 2, wherein the top base surface 8 of the left prismatic half-cover piece 4 and the top base surface 8 of the right prismatic half-cover piece 6 forms the combined top surface, and wherein the bottom base surface 10 of the left prismatic half-cover piece 4 and the bottom base surface 10 of the right prismatic half-cover piece 6 forms the combined bottom surface. This physical characteristic allows the hole cover 2 to be more easily wedged into an ice fishing hole. A wedging chamfer can alternatively be integrated into an intersection edge between the combined lateral surface and the combined top surface.

Although the invention has been explained in relation to its preferred embodiment, it is to be understood that many other possible modifications and variations can be made without departing from the spirit and scope of the invention as hereinafter claimed.

What is claimed is:

1. An ice-fishing hole cover comprising:

a hole cover;

a living hinge;

the hole cover comprising a left prismatic half-cover piece and a right prismatic half-cover piece;

the living hinge comprising a left hinge portion and a right hinge portion;

the left prismatic half-cover piece and the right prismatic half-cover piece each comprising a top base surface, a bottom base surface, a convex lateral surface, and a straight lateral surface;

the straight lateral surface comprising a first end section, a second end section, and a middle section;

the middle section being positioned equidistant between the first end section and the second end section along the straight lateral surface;

the straight lateral surface of the left prismatic half-cover piece and the straight lateral surface of the right prismatic half-cover piece being positioned along each other;

the left hinge portion being connected onto the top base surface of the left prismatic half-cover piece, adjacent to the straight lateral surface of the left prismatic half-cover piece; and the right hinge portion being connected onto the top base surface of the right prismatic half-cover piece, adjacent to the straight lateral surface of the right prismatic half-cover piece.

2. The ice-fishing hole cover as claimed in claim 1 further comprising:

the left hinge portion being positioned in between the middle section of the left prismatic half-cover piece and the first end section of the left prismatic half-cover piece; and the right hinge portion being positioned in between the middle section of the right prismatic half-cover piece and the first end section of the right prismatic half-cover piece.

3. The ice-fishing hole cover as claimed in claim 1 further comprising:

the left prismatic half-cover piece and the right prismatic half-cover piece each further comprising a slot chamfer;

the slot chamfer being integrated along an intersection edge between the top base surface and the straight lateral surface; and the slot chamfer being positioned between the middle section and the second end section.

4. The ice-fishing hole cover as claimed in claim 1 further comprising:

wherein the left prismatic half-cover piece and the right prismatic half-cover piece are arranged in an operative configuration; and the straight lateral surface of the left prismatic half-cover piece and the straight lateral surface of the right prismatic half-cover piece being positioned parallel and offset to each other by a slot gap.

5. The ice-fishing hole cover as claimed in claim 4 further comprising:

a plurality of bristles;

the plurality of bristles being mounted in between the straight lateral surface of the left prismatic half-cover piece and the straight lateral surface of the right prismatic half-cover piece;

the plurality of bristles being positioned through the slot gap; and the plurality of bristles being positioned between the middle section and the second end section.

6. The ice-fishing hole cover as claimed in claim 1 further comprising:

at least one magnetic fastener;

the at least one magnetic fastener comprising a left fastener piece and a right fastener piece;

the left fastener piece being integrated into the straight lateral surface of the left prismatic half-cover piece;

the left fastener piece being positioned in between the middle section of the left prismatic half-cover piece and the first end section of the left prismatic half-cover piece;

the right fastener piece being integrated into the straight lateral surface of the right prismatic half-cover piece; and the right fastener piece being positioned in between the middle section of the right prismatic half-cover piece and the first end section of the right prismatic half-cover piece.

7. The ice-fishing hole cover as claimed in claim 1, wherein the left prismatic half-cover piece and the right prismatic half-cover piece are made of a thermally-insulative rigid foam.

8. The ice-fishing hole cover as claimed in claim 1 further comprising:

a left silicone coating;

a right silicone coating;

the left silicone coating being externally applied to the left prismatic half-cover piece; and the right silicone coating being externally applied to the right prismatic half-cover piece.

9. The ice-fishing hole cover as claimed in claim 1, wherein the living hinge is made of corrugated plastic.

10. The ice-fishing hole cover as claimed in claim 1, wherein the convex lateral surface of the left prismatic half-cover piece and the convex lateral surface of the right prismatic half-cover piece forms a combined lateral surface of the hole cover, and wherein the combined lateral surface is shaped with at least one straight section.

11. The ice-fishing hole cover as claimed in claim 10, wherein the combined lateral surface is shaped as a hexagon.

12. The ice-fishing hole cover as claimed in claim 10, wherein the top base surface of the left prismatic half-cover piece and the top base surface of the right prismatic half-cover piece forms a combined top surface of the hole cover, and wherein the bottom base surface of the left prismatic half-cover piece and the bottom base surface of the right prismatic half-cover piece forms a combined bottom surface of the hole cover, and wherein the combined lateral surface tapers from the combined top surface to the combined bottom surface.

13. An ice-fishing hole cover comprising:

a hole cover;

a living hinge;

the hole cover comprising a left prismatic half-cover piece and a right prismatic half-cover piece;

the living hinge comprising a left hinge portion and a right hinge portion;

the left prismatic half-cover piece and the right prismatic half-cover piece each comprising a top base surface, a bottom base surface, a convex lateral surface, a straight lateral surface, and a slot chamfer;

the straight lateral surface comprising a first end section, a second end section, and a middle section;

the middle section being positioned equidistant between the first end section and the second end section along the straight lateral surface;

the straight lateral surface of the left prismatic half-cover piece and the straight lateral surface of the right prismatic half-cover piece being positioned along each other;

the left hinge portion being connected onto the top base surface of the left prismatic half-cover piece, adjacent to the straight lateral surface of the left prismatic half-cover piece;

the right hinge portion being connected onto the top base surface of the right prismatic half-cover piece, adjacent to the straight lateral surface of the right prismatic half-cover piece;

the left hinge portion being positioned in between the middle section of the left prismatic half-cover piece and the first end section of the left prismatic half-cover piece;

the right hinge portion being positioned in between the middle section of the right prismatic half-cover piece and the first end section of the right prismatic half-cover piece;

the slot chamfer being integrated along an intersection edge between the top base surface and the straight lateral surface; and the slot chamfer being positioned between the middle section and the second end section.

14. The ice-fishing hole cover as claimed in claim 13 further comprising:

wherein the left prismatic half-cover piece and the right prismatic half-cover piece are arranged in an operative configuration;

a plurality of bristles;

the straight lateral surface of the left prismatic half-cover piece and the straight lateral surface of the right prismatic half-cover piece being positioned parallel and offset to each other by a slot gap;

the plurality of bristles being mounted in between the straight lateral surface of the left prismatic half-cover piece and the straight lateral surface of the right prismatic half-cover piece;

the plurality of bristles being positioned through the slot gap; and the plurality of bristles being positioned between the middle section and the second end section.

15. The ice-fishing hole cover as claimed in claim 13 further comprising:

at least one magnetic fastener;

the at least one magnetic fastener comprising a left fastener piece and a right fastener piece;

the left fastener piece being integrated into the straight lateral surface of the left prismatic half-cover piece;

the left fastener piece being positioned in between the middle section of the left prismatic half-cover piece and the first end section of the left prismatic half-cover piece;

the right fastener piece being integrated into the straight lateral surface of the right prismatic half-cover piece; and the right fastener piece being positioned in between the middle section of the right prismatic half-cover piece and the first end section of the right prismatic half-cover piece.

16. The ice-fishing hole cover as claimed in claim 13, wherein the left prismatic half-cover piece and the right prismatic half-cover piece are made of a thermally-insulative rigid foam.

17. The ice-fishing hole cover as claimed in claim 13 further comprising:

a left silicone coating;

a right silicone coating;

the left silicone coating being externally applied to the left prismatic half-cover piece; and the right silicone coating being externally applied to the right prismatic half-cover piece.

18. The ice-fishing hole cover as claimed in claim 13, wherein the living hinge is made of corrugated plastic.

19. The ice-fishing hole cover as claimed in claim 13, wherein the convex lateral surface of the left prismatic half-cover piece and the convex lateral surface of the right prismatic half-cover piece forms a combined lateral surface of the hole cover, and wherein the combined lateral surface is shaped as a hexagon.

20. The ice-fishing hole cover as claimed in claim 19, wherein the top base surface of the left prismatic half-cover piece and the top base surface of the right prismatic half-cover piece forms a combined top surface of the hole cover, and wherein the bottom base surface of the left prismatic half-cover piece and the bottom base surface of the right prismatic half-cover piece forms a combined bottom surface of the hole cover, and wherein the combined lateral surface tapers from the combined top surface to the combined bottom surface.

* * * * *